United States Patent
McKinnon

(10) Patent No.: US 6,825,807 B1
(45) Date of Patent: Nov. 30, 2004

(54) PREVENTING INTERFERENCE DUE TO MISALIGNED GROUND TERMINALS

(75) Inventor: Douglas V. McKinnon, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/374,316

(22) Filed: Feb. 25, 2003

(51) Int. Cl.$^7$ ............................. H01Q 3/00; H04B 7/00
(52) U.S. Cl. ........................................ 342/359; 455/69
(58) Field of Search ................................ 342/359, 356; 455/69, 12.1, 522

(56) References Cited

U.S. PATENT DOCUMENTS

| | | | |
|---|---|---|---|
| 5,258,764 A | | 11/1993 | Malinowski |
| 5,739,788 A | * | 4/1998 | Dybdal et al. ............... 342/359 |
| 5,933,111 A | * | 8/1999 | Schroeder et al. .......... 342/359 |
| 2002/0057225 A1 | * | 5/2002 | Spirtus ........................ 342/359 |

* cited by examiner

*Primary Examiner*—Bernarr E. Gregory
*Assistant Examiner*—F H Mull
(74) *Attorney, Agent, or Firm*—McDermott Will & Emery LLP

(57) ABSTRACT

Embodiments of the present invention are directed to a method and an apparatus for preventing interference of geosynchronous satellites due to ground stations with misaligned antennas. In one embodiment, a two-way satellite ground terminal is configured to communicate with a geosynchronous target satellite which transmits a target satellite signal. The ground terminal comprises an antenna which is configured to receive the target satellite signal from the geosynchronous target satellite only if the antenna is oriented toward the geosynchronous target satellite. A transmitter is configured to transmit signals from the ground terminal via the antenna A signal detector is operatively coupled with the antenna and with the transmitter. The signal detector is configured to enable the transmitter to transmit signals from the ground terminal to the target satellite via the antenna only upon detecting the target satellite signal received by the antenna from the geosynchronous target satellite at a signal level above a preset threshold level.

23 Claims, 3 Drawing Sheets

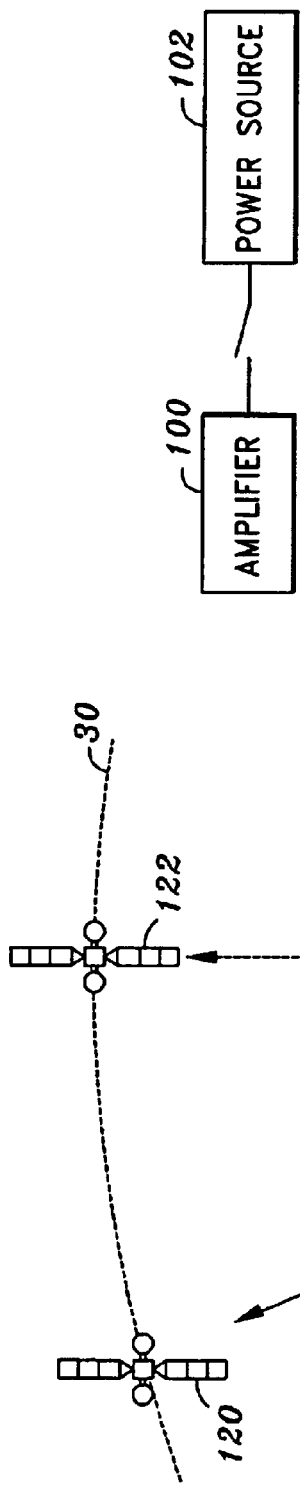

PREVENTING INTERFERENCE DUE TO MISALIGNED GROUND TERMINALS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

BACKGROUND OF THE INVENTION

The present invention relates generally to satellite systems and, more particularly, to a method and an apparatus for preventing interference from signal transmission due to misaligned ground terminals.

Ground terminals are in widespread use in satellite communications systems today. When ground terminals are installed, they are turned on and acquire satellite signals. For satellites in geosynchronous orbits (geosynchronous satellites), such as the C/Ku/Ka-band satellites being used to provide a variety of services including television distribution and two-way communications networks (e.g., VSAT and Internet connection systems) in common use today, acquiring satellite signals at turn-on is not a difficult problem. Geosynchronous satellites appear stationary relative to a fixed point on earth, and so it is relatively simple to point a ground terminal antenna to acquire a geosynchronous satellite signal. On the other hand, geosynchronous satellites are rather closely spaced from each other because only a limited number of satellites can be placed on the geosynchronous orbit. As a result, even a slight misalignment of the ground terminal antenna by a small angle (e.g., about 1–2 degrees) will affect the communication between the ground terminal and the intended or target geosynchronous satellite. The antenna of a ground terminal may be misaligned due to poor installation or disrupted due to weather or other factors. When the ground terminal with the misaligned antenna transmits signals intended for the target satellite, the signals may interfere with the operation of the geosynchronous satellite(s) adjacent to the target satellite. Locating and fixing offending ground terminals is difficult and time-consuming.

BRIEF SUMMARY OF THE INVENTION

Embodiments of the present invention are directed to a method and an apparatus for preventing interference of geosynchronous satellites due to ground stations with misaligned antennas. Preventing this problem is particularly important for broadband systems because they require orders of magnitude more ground terminals than are currently in use to be successful.

An aspect of the present invention is directed to a two-way satellite ground terminal configured to communicate with a geosynchronous target satellite which transmits a target satellite signal. The ground terminal comprises an antenna which is configured to receive the target satellite signal from the geosynchronous target satellite only if the antenna is oriented toward the geosynchronous target satellite. A transmitter is configured to transmit signals from the ground terminal via the antenna. A signal detector is operatively coupled with the antenna and with the transmitter. The signal detector is configured to enable the transmitter to transmit signals from the ground terminal to the target satellite via the antenna only upon detecting the target satellite signal received by the antenna from the geosynchronous target satellite at a signal level above a preset threshold level.

In some embodiments, the transmitter includes a signal interlock switch which is activated by the signal detector to enable the transmitter to transmit signals from the ground terminal to the target satellite via the antenna only upon detecting the target satellite signal received by the antenna from the geosynchronous target satellite at a signal level above the preset threshold level. The signal interlock switch is coupled with a signal source, is normally in an open position, and moves to a closed position to form a signal path from the signal source through the transmitter to the antenna only upon detecting the target satellite signal received by the antenna from the geosynchronous target satellite at a signal level above the preset threshold level. The signal interlock switch is configured to move from the closed position to the open position after a preset period of time upon detecting loss of the target satellite signal. The signal detector is coupled between the antenna and the signal interlock switch by a feedback loop. The target satellite signal may comprise a signal at a specified frequency, or a signal encoded with a specified code. The ground terminal includes a directional antenna that receives signals from and transmits signals to the geosynchronous target satellite.

Another aspect of the invention is directed to a two-way satellite ground terminal configured to communicate with a geosynchronous target satellite which transmits a target satellite signal. The ground terminal comprises an antenna which is configured to receive the target satellite signal from the geosynchronous target satellite only if the antenna is oriented toward the geosynchronous target satellite. The ground terminal further comprises a signal source, and a transmitter operatively coupled between the signal source and the antenna. The transmitter is configured to transmit signals from the signal source via the antenna to the target satellite only if the antenna receives the target satellite signal from the geosynchronous target satellite at a signal level above a preset threshold level.

In some embodiments, a signal interlock switch is operatively coupled between the transmitter and the signal source. The signal interlock switch is normally in an open position and moves to a closed position to form a signal path from the signal source through the transmitter to the antenna only if the antenna receives the target satellite signal from the geosynchronous target satellite at a signal level above the preset threshold level. The signal interlock switch is configured to move from the closed position to the open position after a preset period of time upon detecting loss of the target satellite signal.

Another aspect of the present invention is directed to a method of preventing interfering signals from being transmitted by a two-way satellite ground terminal to unintended satellites, wherein the ground terminal is configured to communicate with a geosynchronous target satellite which transmits a target satellite signal. The method comprises providing an antenna for the ground terminal. The antenna is configured to receive the target satellite signal from the geosynchronous target satellite only if the antenna is oriented toward the geosynchronous target satellite. Signals are transmitted from the ground terminal to the target satellite via the antenna only upon detecting the target satellite signal received by the antenna from the geosynchronous target at a signal level above a preset threshold level.

In some embodiments, transmitting signals from the ground terminal comprises coupling a transmitter to a signal source by activating a signal interlock switch operatively coupled between the transmitter and the signal source to form a signal path from the signal source through the transmitter to the antenna. The signal interlock switch is deactivated to terminate the signal path from the signal source through the transmitter to the antenna after a preset period of time upon detecting loss of the target satellite signal.

In accordance with another aspect of the invention, a two-way satellite ground terminal configured to communicate with a geosynchronous target satellite comprises a servicing antenna, and an aligning antenna connected with the servicing antenna and being configured to receive a verification signal from a geosynchronous reference satellite only if the aligning antenna is oriented toward the geosynchronous reference satellite with the servicing antenna oriented toward the geosynchronous target satellite. A transmitter is configured to transmit signals from the ground terminal via the servicing antenna. A signal detector is operatively coupled with the aligning antenna and with the transmitter. The signal detector is configured to enable the transmitter to transmit signals from the ground terminal to the target satellite via the servicing antenna only upon detecting the verification signal received by the aligning antenna from the geosynchronous reference satellite at a signal level above a preset threshold level.

BRIEF DESCRIPTION OF THE DRAWINGS

FIG. 3 is a simplified schematic view of a signal amplifier in the ground terminal according to another embodiment of the invention; and FIG. 4 is a simplified schematic view of the antenna structure of the ground terminal according to another embodiment of the invention.

DETAILED DESCRIPTION OF THE INVENTION

Figure 1:
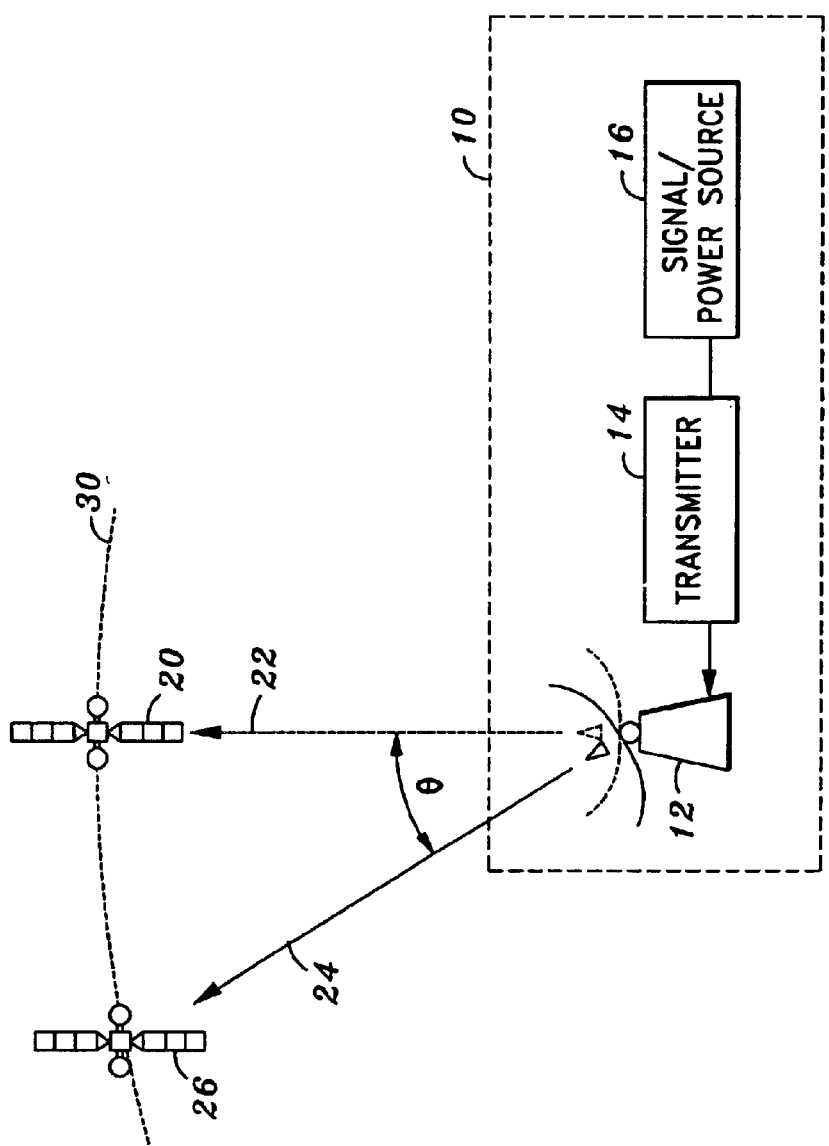
FIG. 1 is a simplified schematic view illustrating communications between geosynchronous satellites and a ground terminal with a misaligned antenna.

FIG. 1 shows a ground terminal or station 10 having an antenna 12, a transmitter 14, and a signal/power source 16. The ground terminal 10 may be a VSAT (very small aperture terminal) or another two-way satellite ground terminal. The antenna 12 is a directional antenna that receives signals from and transmits signals to the target satellite 20. A properly aligned antenna 12, as illustrated by broken lines, would point at the target satellite 20 along the desired signal path 22. When the antenna 12 is misaligned by an angle θ, the actual signal path 24 may be pointed at an adjacent satellite 26 instead. The satellites 20, 26 are geosynchronous satellites orbiting around the geosynchronous orbital arc 30. When a signal is transmitted by the transmitter 14 via the misaligned antenna 12 pointed at the adjacent satellite 26, it becomes an interfering signal for the adjacent satellite 26 as the unintended target.

Figure 2:
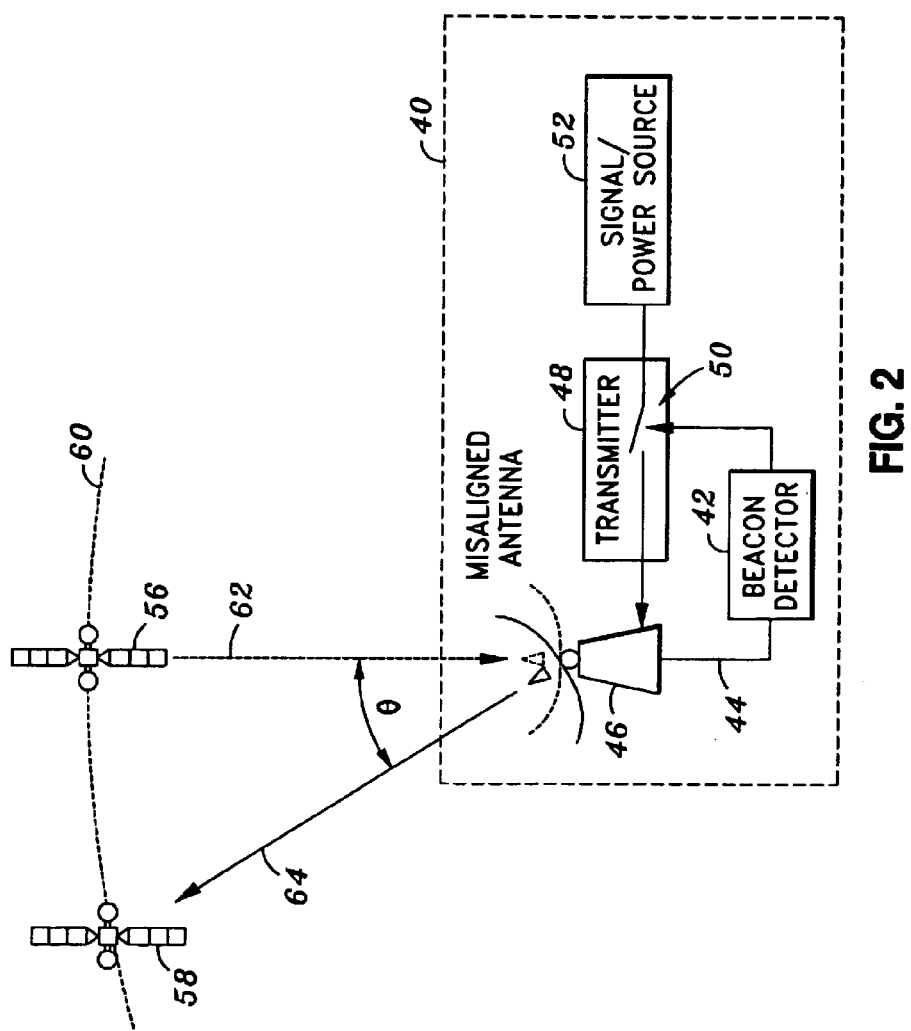
FIG. 2 is a simplified schematic view illustrating communications between geosynchronous satellites and a ground terminal configured to prevent interference due to a misaligned antenna according to an embodiment of the present invention.

FIG. 2 presents one solution to the problem of misaligned antenna of a ground terminal. The ground terminal 40 includes a beacon or signal detector 42 connected in a feedback loop 44 between the antenna 46 and the transmitter 48. The transmitter 48 includes a signal interlock switch 50, and is coupled to the signal/power source 52. In the open position which is typically the default or normal position, the signal interlock switch 50 prevents transmission of signals from the ground terminal 40 to the satellite. In the closed position, the signal interlock switch 50 permits coupling of the transmitter 48 with the signal/power source 52 to transmit signals via the antenna 46 to the satellite. The transmitter 48 is enabled when the signal interlock switch 50 is in the closed position and is disabled when the signal interlock switch 50 is in the open position. The transmitter 48 may be disabled by disconnecting the signal source or the power source from the transmitter 48. In some cases, the transmitter 48 is disabled by disabling the high power amplifier 100 (using the amplifier circuitry) for the signal or disconnecting power 102 to the amplifier, as schematically illustrated in FIG. 3. These various ways of enabling and disabling the transmitter 48 are intended to be covered by the concept of the signal interlock switch 50. The target satellite 56 and the adjacent satellite 58 orbit around the geosynchronous orbital arc 60.

The target satellite 56 transmits a beacon or signal at a unique frequency or encoded with a unique code which can be received by the antenna 46 along a target signal path 62. The signal may be, for instance, a digital sequence at a specified frequency or a telemetric stream of control codes. If the beacon detector 42 of the ground terminal 40 detects the satellite signal at the specified frequency or code at a signal level which is above a settable threshold, then the antenna 46 is properly aligned with the target satellite 56. The settable threshold can be preset by the manufacturer or installer of the system. This signal is used in the feedback loop 44 to close the signal interlock switch 50 to permit the transmitter 48 to transmit signals via the antenna 46 to the target satellite 56. If the beacon detector 42 of the ground terminal 40 is unable to detect the satellite signal at the unique frequency or unique code at a signal level which is above the settable threshold, then the antenna 46 is misaligned with respect to the target satellite 56 and may be pointed at the adjacent satellite 58 at an angle θ along the misaligned signal path 64 instead. In that case, the signal interlock switch 50 remains open so as to prevent the transmission of signals from the ground terminal 40. This avoids the transmission of interfering signals from the ground terminal 40 to the adjacent satellite 58 when the antenna 46 is misaligned. The signal interlock switch 50 may be configured to move from the closed position to the open position after the elapse of a preset period of time (e.g., about 0–120 seconds) upon detecting loss of the target satellite signal. The loss of the target satellite signal may be detected by any suitable known methods. Signal transmission by the transmitter 48 is again enabled only when the target satellite signal from the target satellite 56 is again detected by the beacon detector 42. Returning the signal interlock switch 50 to the normally open position ensures that any future misalignment of the antenna 46 will be detected and the transmission of interfering signals will be prevented.

The beacon or signal may be transmitted by the target satellite 56 intermittently or periodically as desired or specified. The absence of detection of the satellite signal is an indication that the antenna 46 is misaligned and that realignment of the antenna 46 is needed. The satellite signal can also be used to align the antenna 46 with the target satellite 56, particularly if the misalignment is small, i.e., to within about 1–2 degrees. The alignment can be performed manually or automatically, and the detection of the satellite signal by the beacon detector 42 will inform the user who manually aligns the antenna 46 or the alignment system which automatically aligns the antenna 46 to stop upon achieving proper alignment of the antenna 46. The alignment system may employ sensors such as GPS (global positioning system) sensors or the like. The signal interlock switch 48 can be any suitable electrical or electronic switch, such as a relay switch. The beacon or signal detector 42 can be any suitable electrical or electronic detector, such as a frequency detection circuit or a digital code detecting circuit.

The antenna 46 described above has multiple feeds that allow it to detect a verification signal from the target satellite 56 when properly aligned and transmits and receives signals once it is aligned. In another embodiment as illustrated in FIG. 4, the ground terminal includes two antennas. The aligning antenna 110 detects a verification signal from a reference satellite 120 when properly aligned. The servicing antenna 112 is rigidly connected to the aligning antenna 10, and provides the ground terminal's desired functionality. The aligning antenna serves to align the servicing antenna 112, since they are fixed with respect to one another. The servicing antenna 112 communicates with a servicing satellite or target satellite 122 by transmitting signals to and receiving signals from the satellite. The receipt of the verification signal by the aligning antenna 110 is used to enable the servicing antenna's interlock circuitry and enable transmissions to occur. This is useful to a system operator that desires to use only one verification signal carrying satellite.

The above-described arrangements of apparatus and methods are merely illustrative of applications of the principles of this invention and many other embodiments and modifications may be made without departing from the spirit and scope of the invention as defined in the claims. For instance, the beacon detector 42 need not be physically coupled with the antenna 46 and the signal interlock switch 50, but may be operatively coupled with those components (e.g., wirelessly). The scope of the invention should, therefore, be to the above description, but instead should be determined with ms along with their full scope of equivalents.

What is claimed is:

1. A two-way satellite ground terminal configured to communicate with a geosynchronous target satellite which transmits a target satellite signal, the ground terminal comprising:
    an antenna which is configured to receive the target satellite signal from the geosynchronous target satellite only if the antenna is oriented toward the geosynchronous target satellite;
    a transmitter configured to transmit signals from the ground terminal via the antenna; and
    a signal detector operatively coupled with the antenna and with the transmitter, the signal detector being configured to enable the transmitter to transmit signals from the ground terminal to the target satellite via the antenna only upon detecting the target satellite signal received by the antenna from the geosynchronous target satellite at a signal level above a preset threshold level.

2. The ground terminal of claim 1 wherein the transmitter includes a signal interlock switch which is activated by the signal detector to enable the transmitter to transmit signals from the ground terminal to the target satellite via the antenna only upon detecting the target satellite signal received by the antenna from the geosynchronous target satellite at a signal level above the preset threshold level.

3. The ground terminal of claim 2 wherein the signal interlock switch is coupled with a signal source, is normally in an open position, and moves to a closed position to form a signal path from the signal source through the transmitter to the antenna only upon detecting the target satellite signal received by the antenna from the geosynchronous target satellite at a signal level above the preset threshold level.

4. The ground terminal of claim 3 wherein the signal interlock switch is configured to move from the closed position to the open position after a preset period of time upon detecting loss of the target satellite signal.

5. The ground terminal of claim 2 wherein the signal detector is coupled between the antenna and the signal interlock switch by a feedback loop.

6. The ground terminal of claim 1 wherein the target satellite signal comprises a signal at a specified frequency.

7. The ground terminal of claim 1 wherein the target satellite signal comprises a signal encoded with a specified code.

8. A two-way satellite ground terminal configured to communicate with a geosynchronous target satellite which transmits a target satellite signal, the ground terminal comprising:
    an antenna which is configured to receive the target satellite signal from the geosynchronous target satellite only if the antenna is oriented toward the geosynchronous target satellite;
    a signal source; and
    a transmitter operatively coupled between the signal source and the antenna, the transmitter being configured to transmit signals from the signal source via the antenna to the target satellite only if the antenna receives the target satellite signal from the geosynchronous target satellite at a signal level above a preset threshold level.

9. The ground terminal of claim 8 further comprising a signal interlock switch operatively coupled between the transmitter and the signal source, the signal interlock switch being normally in an open position and moving to a closed position to form a signal path from the signal source through the transmitter to the antenna only if the antenna receives the target satellite signal from the geosynchronous target satellite at a signal level above the preset threshold level.

10. The ground terminal of claim 9 wherein the signal interlock switch is configured to move from the closed position to the open position after a preset period of time upon detecting loss of the target satellite signal.

11. The ground terminal of claim 8 further comprising a signal detector operatively coupled with the antenna and with the transmitter, the signal detector being configured to enable the transmitter to transmit signals from the signal source via the antenna to the target satellite only upon detecting the target satellite signal received by the antenna from the geosynchronous target satellite at a signal level above the preset threshold level.

12. The ground terminal of claim 11 wherein the signal detector is coupled between the antenna and the transmitter by a feedback loop.

13. A method of preventing interfering signals from being transmitted by a two-way satellite ground terminal to unintended satellites, wherein the ground terminal is configured to communicate with a geosynchronous target satellite which transmits a target satellite signal, the method comprising:
    providing an antenna for the ground terminal, the antenna being configured to receive the target satellite signal from the geosynchronous target satellite only if the antenna is oriented toward the geosynchronous target satellite; and transmitting signals from the ground terminal to the target satellite via the antenna only upon detecting the target satellite signal received by the antenna from the geosynchronous target at a signal level above a preset threshold level.

14. The method of claim 13 wherein the target satellite signal comprises a signal at a specified frequency.

15. The method of claim 13 wherein the target satellite signal comprises a signal encoded with a specified code.

16. The method of claim 13 wherein transmitting signals from the ground terminal comprises coupling a transmitter to a signal source by activating a signal interlock switch operatively coupled between the transmitter and the signal source to form a signal path from the signal source through the transmitter to the antenna.

17. The method of claim 16 further comprising deactivating the signal interlock switch to terminate the signal path from the signal source through the transmitter to the antenna after a preset period of time upon detecting loss of the target satellite signal.

18. The method of claim 13 further comprising providing a signal detector configured to detect for reception by the antenna of the target satellite signal from the geosynchronous target satellite.

19. The method of claim 18 wherein the signal detector is coupled between the antenna and a transmitter by a feedback loop, the signal detector being configured to activate the transmitter to transmit signals upon detecting the target satellite signal received by the antenna from the geosynchronous target at a signal level above the preset threshold level.

20. The method of claim 19 wherein the signal detector is configured to activate the transmitter by coupling the transmitter to a signal source to form a signal path from the signal source through the transmitter to the antenna.

21. A two-way satellite ground terminal configured to communicate with a geosynchronous target satellite, the ground terminal comprising:

a servicing antenna;

an aligning antenna connected with the servicing antenna and being configured to receive a verification signal from a geosynchronous reference satellite only if the aligning antenna is oriented toward the geosynchronous reference satellite with the servicing antenna oriented toward the geosynchronous target satellite;

a transmitter configured to transmit signals from the ground terminal via the servicing antenna; and a signal detector operatively coupled with the aligning antenna and with the transmitter, the signal detector being configured to enable the transmitter to transmit signals from the ground terminal to the target satellite via the servicing antenna only upon detecting the verification signal received by the aligning antenna from the geosynchronous reference satellite at a signal level above a preset threshold level.

22. The ground terminal of claim 21 wherein the aligning antenna and the servicing antenna are configured as a single antenna having multiple feeds.

23. The ground terminal of claim 21 wherein the transmitter includes a signal interlock switch which is activated by the signal detector to enable the transmitter to transmit signals from the ground terminal to the target satellite via the servicing antenna only upon detecting the verification signal received by the aligning antenna from the geosynchronous reference satellite at a signal level above the preset threshold level.

* * * * *